July 7, 1959

L. J. KAMM 2,893,630

AUTOMATIC DECIMAL POINT SLIDE RULE

Filed April 30, 1956

EXAMPLE: $\dfrac{450 \times .07}{26 \times 3 \times 10^5 \times 52}$

Inventor

LAWRENCE J. KAMM

By Max L. Libman

Attorney

United States Patent Office 2,893,630
Patented July 7, 1959

2,893,630
AUTOMATIC DECIMAL POINT SLIDE RULE

Lawrence J. Kamm, Silver Spring, Md.

Application April 30, 1956, Serial No. 581,575

5 Claims. (Cl. 235—64.3)

This invention relates to slide rules, and more particularly to a slide rule having means for automatically indicating correct decimal magnitude of all quantities used in a computation.

Various mechanisms have been provided in slide rules to facilitate the location of a decimal point in the final answer, but all of them have had some drawbacks which mitigated against their acceptance. Some have required the manipulation of mechanical devices added to the usual slide rule structure and others have required certain preliminary pencil and paper calculations, the object being to reduce the possibility of error in detecting the correct position of the decimal point in the final answer or to reduce the amount of mental or paper calculation; but all have involved so much physical or mental computation that little was gained in comparison to the effort required.

It is a primary object of my invention to provide a slide rule which utilizes the conventional slide rule construction and which is manipulated on conventional principles to definitely determine, without any mental calculations, the magnitude of the quantities resulting from the computations.

Another object is to provide the slide rule which shows at all stages in a computation the magnitude of the quantities under consideration. In other words, not only is the correct magnitude of the final answer given, but also the correct magnitude of all intermediate numbers used in obtaining the answer.

Another object is to provide a slide rule which will give a direct reading of all computed quantities whether above or below 1 in value.

A further object is to provide means in a slide rule for checking the digits obtained on the C and D scales, during the process of obtaining the correct magnitude.

Still another object is to provide a slide rule having at least two separate sets of scales of different orders of accuracy, one scale being larger than the other, whereby a rough solution of a problem may be worked out on the smaller scale to a correct decimal value, and the problem may be re-worked on the larger scale to obtain a more accurate answer in the conventional slide rule fashion, but without an indication of the correct decimal value.

A further object is the provision of a slide rule having a series of identical logarithmic scales sufficient in number to cover the entire range of orders of magnitude used in almost all engineering problems, whereby problems may be worked directly in the true magnitudes of the quantities involved, instead of working the problem over a scale covering one or at most only a few orders of magnitude, as is usually done, so that additional computation is required to establish the correct order of magnitude of the final answer.

Another object is to provide a slide rule having trigonometric and other functions on the same scale and on the same face of the slide rule is the arithmetic scales, in a new and advantageous relationship.

A further object is the provision of an automatic decimal point slide rule having no more moving parts than the conventional slide rule.

A further object is to provide both direct and inverted logarithmic decimal point scales for simplifying computations.

The specific nature of the invention, as well as other objects and advantages thereof, will clearly appear from a description of a preferred embodiment as shown in the accompanying drawings in which.

Figure 1:
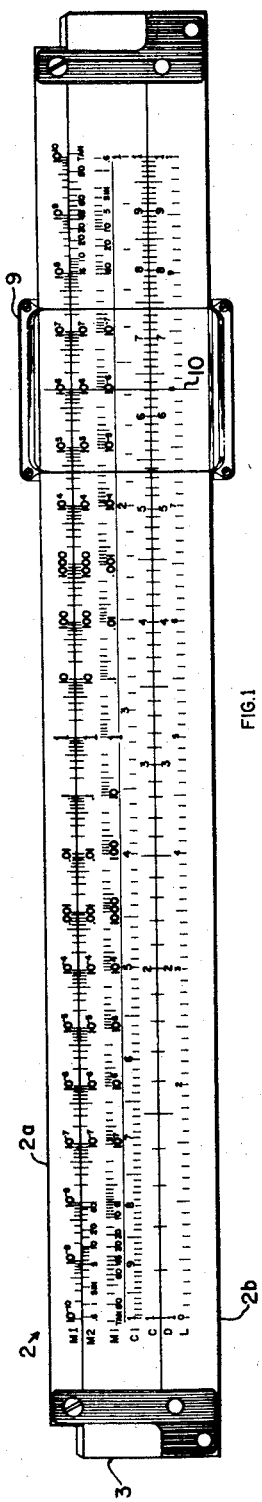
Fig. 1 is a plan view of a slide rule according to the invention.

Referring to Fig. 1, the slide rule comprises the main body 2 having an upper portion 2a and a lower portion 2b, and a slider portion 3 mounted for longitudinal motion with respect to the body portion in any conventional manner. The lower edge of the slider 3 and the adjacent upper edge of lower portion 2b of the body are provided with the usual logarithmic C and D scales, as shown, the customary finer divisions of these scales being omitted on most of the scale in the figure, since these divisions are conventional; however, it will be understood that the C and D scales, and also the C$i$ or inverted C scale bear the customary divisions and markings and are conventional in every respect. The extreme upper and lower edges of body portion 2a and 2b respectively may also bear any other conventional scales usually employed on slide rules. The lower edge of upper portion 2a and the adjacent upper edge of slider 3 bear special scales which are marked M1, M2 and M$i$ respectively in the drawing. M1 and M2 are for the most part identical, although it will be apparent that some differences may be introduced without affecting the principle employed, as will be shown below. Each of these last scales consists of a series of identical sub-scales, each sub-scale being logarithmically divided as shown in detail in Figs. 2 and 3, so that each sub-scale resembles the C and D scale reduced to approximately $\frac{1}{20}$ of its length, since there are 20 such scales extending along the M$i$ scale. It will be noted that the center sub-scale division or mark or index is marked 1, or 10°, and the sub-scales to the right of it are successively marked 10 (or $10^1$), 100 (or $10^2$), 1000 (or $10^3$), etc., while the sub-scales to the left of the center scale are successively marked 0.1 (or $10^{-1}$), 0.01 (or $10^{-2}$), 0.001 (or $10^{-3}$), etc. The sub-scales thus extend from $10^{-10}$ on the extreme left to $10^{10}$ on the extreme right. It is important to notice that these sub-scales thus cover substantially the entire range of engineering magnitudes since it will very seldom occur that any practical engineering computation will involve, at any stage of the computation, magnitudes not embraced by this range of sub-scales.

The slide rule is completed by providing a conventional cursor 9 having the usual transverse fiduciary hairline 10. The cursor is, of course, arranged for longitudinal sliding movement on the body 2.

The uses and advantages of the slide rule can best be illustrated by showing the manner in which it is used to solve a typical problem, for example, the value of the term:

$$\frac{450 \times .07}{26 \times 3 \times 10^5 \times 52}$$

It will be apparent that in carrying out the above computation with an ordinary slide rule, there will be some uncertainty as to the order of magnitude of the number finally obtained as the answer. The correct answer is $7.77 \times 10^{-8}$, and while the conventional slide rule will produce the three digits 777, with some uncertainty as to the last digit, in order to determine the correct position of the decimal point, or the correct value of the negative exponent, whichever notation is employed, a separate calculation with paper and pencil is usually necessary.

Figure 2:
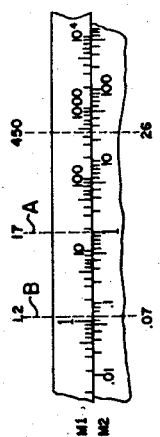
Fig. 2 is a plan view of a portion of the slide rule of Fig. 1 set for the first step in the solution of a particular problem.

Fig. 2 shows the first setting for the solution of the above problem, using the M scales of the invention. For the purpose of illustration, the problem can be broken down into four steps as shown below:

(A) $$\frac{450}{26} = 17.32$$

(B) $$17.32 \times .07 = 1.21$$

(C) $$\frac{1.21}{3 \times 10^5} = 4.04 \times 10^{-6}$$

(D) $$\frac{4.04 \times 10^{-6}}{52} = 7.77 \times 10^{-8}$$

Figure 3:
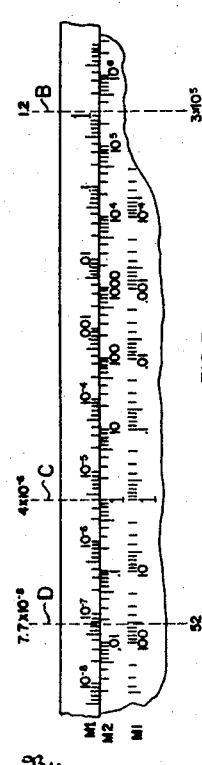
Fig. 3 is a plan view of a portion of the slide rule of Fig. 1 set for a second step in the solution of the same problem.

Fig. 2 shows the slide rule set for the above steps A and B, which can be performed with one setting of the slide rule. The cursor is set so that its hair line 10 is over the value 450 as shown at A. This, of course, is on that sub-scale between the indicia $10^2$ and $10^3$ on scale M1, which uniquely on this scale represents the value 450. The slider 3 is then moved until the value 26 is also under the hairline 10. This number is also uniquely found between the indicia 1.0 and 100 on scale M2. The answer to A of the problem will be found opposite the center line (the scale value 1.0) of the M2 scale and can be read as 17.3 on the M1 scale between numbers 10 and 100. Since the next step (B) is to multiply this quantity by .07, it is not necessary to again move the slider at this stage, but instead the cursor is moved so that its hairline 10 is over the value .07 on scale M2, corresponding to position B in Fig. 2. This gives the answer (on M1) 1.21 for step B; more correctly, this gives an approximation to this answer, since the small scale can be read at best only to two significant figures. In order to accomplish the next step (C), the cursor is held stationary at point B, and the slider is moved until the value $3 \times 10^5$ is under the hairline, as shown in Fig. 3. The answer for this step ($4.04 \times 10^{-6}$) now appears over the central reference point (1.0) of scale M2 on scale M1 as shown at C in Fig. 3. The last step is a division by 52, for which the Mi scale can be conveniently used. The cursor is moved so that its hairline 10 is over the value 52 on scale Mi, and the final answer appears on scale M1 as 7.77, or in practical use, something between 7.6 and 7.8. The correct order of magnitude is, of course, established by the particular sub-scale in which the answer appears as $7.7 \times 10^{-8}$.

It is, of course, well known that reducing the scale by $\frac{1}{10}$ causes the loss of one decimal digit in accuracy, and since the present scale is reduced to $\frac{1}{20}$ of the conventional scale size, a slightly greater loss in accuracy than this results. However, it is still readily possible to read the answer to two significant figures. This is sufficient for many engineering calculations, since the slide rule is only used in most instances for the rough initial computation. When the final figures are required, significant figure computation is redone more carefully on the usual C and D scales of the slide rule or in any other manner suitable for the accuracy required. However, the position of the decimal point, i.e., the correct order of magnitude of the answer, has been established by the above procedure for all future use.

In addition to the numerical scales shown, trigonometric and other scales may be added at the ends of the M2 and Mi scales. This produces some important and particular advantages in the case of trigonometric scales if they are added as shown in Fig. 1. In the first place, there is no substantial loss in range, since the M1 scale is unchanged, and this is the answer scale which requires the largest range—the other two scales generally are used for the respective individual factors which are employed at the various steps of a computation, and these are practically always smaller in absolute magnitude than the final answer. It is therefore apparent that the same full range is not needed for the M2 and Mi scales as for the M1 scale. I therefore employ the extra space available at the ends of these latter scales for trigonometric functions as shown in Fig. 1.

Each scale (sin and tan) extends over two cycles. In the case of sin, these represent magnitudes from .01 to 1.0 with 90° at 1.0 (sin 90=1.0) and .6° at .01. In the case of tangent, these represent magnitudes of .1 through 1 to 10.0, with 6° at 0.1, 45° at 1, and 84° at 10. The sin scale from .6° to 6° may also be considered an extension of the tan scale. Thus functions of a wide range of angles may be found directly.

Example: To multiply $35 \times$ tan 60, place the 45° line (1.0) on the M2 tan scale opposite 35 on M1 and at tan 60 on M2 read 61 on M1.

Example: To multiply $35 \times$ sin 30, place the 90° line (1.0) on the M2 sin scale opposite 35 on M1 and at sin 30 on M2 read 18 on M1.

The Mi trig scales are used in the same manner as the Mi decimal scales. The slide rule may be made with trig scales on M1 but not on Mi or vice versa, or with different function scales on M2 (e.g., hyperbolic, double and triple length cycles for squares and cubes and their roots, etc.).

It will thus be seen that it is not necessary to turn over the slide rule when using the trigonometric scales, and that a continuation of the same type of manipulation as in the case of ordinary numbers is sufficient to work out trigonometric problems, with added convenience and less likelihood of error. Furthermore, the usual trigonometric scales are conveniently extended over a large range of values embracing the great majority of practical problems encountered.

Figure 4:
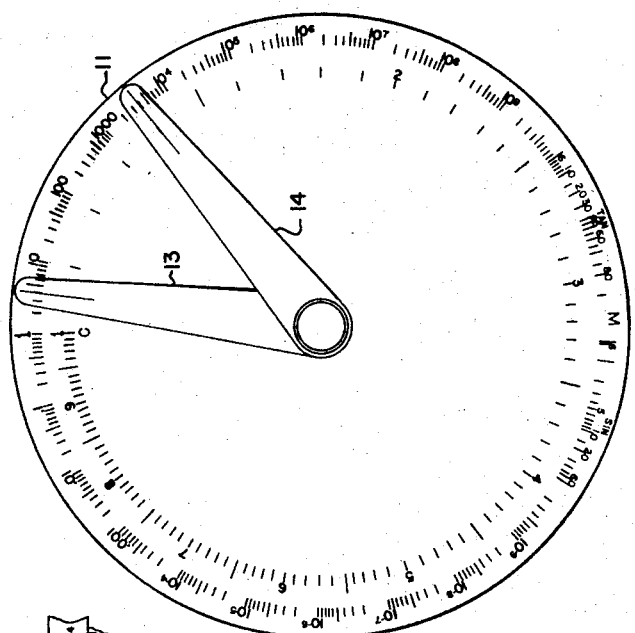
Fig. 4 is a view of an endless or circular slide rule embodying the invention.

Fig. 4 shows the invention applied to a circular slide rule 12 of the type sometimes called an endless slide rule. It is only necessary, in addition to the usual scales, to add a scale similar to the M1 scale of Fig. 1, except that it is arranged on a circle as shown. Transparent arms 13 and 14, each bearing the usual hairline, are so arranged that they may be rotated independently, but sufficient friction is provided between them so that when arm 13, for example, is rotated, it carries arm 14, thus maintaining the angular spacing between the two arms. This serves to establish two points representing any distance on the M scale, which points can then be transferred to another position on the scale, which is essentially what is done in the straight slide rule of Fig. 1, except that the use of two scales reduces the number of settings in most cases. For example, to carry out step A, arm 13 is set at 26 on the M scale and arm 14 is set at 1, then arm 13 is moved to 450, carrying arm 14 with it, and arm 14 will now read 17.3 to give the answer to the first step. The remaining steps are carried out in similar fashion, as will be obvious. Of course, instead of arm 13, a second disc bearing on its outer edge an M2 scale could be used, in which case only a single arm 14 will be used, corresponding to cursor 9 of the straight line arrangement.

Figure 6:
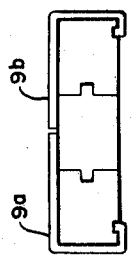
Fig. 6 is an end view of another modified slide rule having two cursors.
Figure 5:
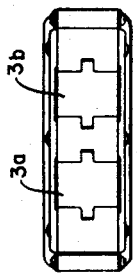
Fig. 5 is an end view of a modified slide rule having two sliders.

It will be apparent that many other structural modifications and arrangements are possible in slide rules embodying the invention, e.g., in some case, it may be desirable in the straight slide rule of Fig. 1, to have two sliders 3a and 3b movable independently with respect to the main body, as shown in Fig. 5, one slider bearing the C and D scales, and the other bearing the M scales. This will permit the rough and fine calculations to be made independently, and either can be retained while the other is being made so that the final answer will then be shown to the maximum accuracy as well as the correct magnitude. Similarly, or alternatively, an upper and a lower cursor can be provided, each slidably fixed with respect to one outer edge of the main body, for retaining each value, as shown at 9a and 9b in Fig. 6.

It will be apparent that the embodiments shown are only exemplary and that various modifications can be made in construction and arrangement within the scope of my invention as defined in the appended claims.

I claim:

1. A slide rule comprising a body portion, a first multiple scale comprising a series of identical logarithmic decimal subscales linearly arranged on said body portion, each successive subscale being marked to represent the range of one successive decimal order of magnitude, the successive subscales of said series being sufficient in number and range to cover substantially the entire range of engineering magnitudes from at least $10^{-6}$ to $10^6$, a slider portion movable in a fixed path with respect to the body portion and bearing a second series of logarithmic subscales in cooperating relationship with said first series of scales and on the same scale of magnitude, and a cursor bearing a reference line extending across both multiple scales and movable in a fixed path with respect to both multiple scales.

2. A slide rule comprising a body portion, a multiple scale comprising a series of substantially identical logarithmic decimal subscales linearly arranged on said body portion, each successive subscale being marked to cover the range of one successive decimal order of magnitude, one of said subscales bearing a unity reference mark, others of said subscales extending in one direction from said reference mark and marked to indicate successive orders of ten having positive exponents and still others of said subscales extending in the other direction from the unity reference mark and marked to indicate successive orders of ten having negative exponents, said subscales extending from at least $10^{-6}$ to $10^6$, and means movable in a fixed path with respect to said scales, and comprising movable means to establish two points representing by the distance between them a quantity on said scale.

3. The invention according to claim 2, said means movable in a fixed path comprising a slider portion movable in a fixed path with respect to said body portion and bearing a series of substantially identical logarithmic scales similar to said first series of scales, but inverted with respect thereto.

4. The invention according to claim 2, said means movable in a fixed path comprising a slider portion bearing a second series of logarithmic scales substantially coextensive scale with said first series of scales, but having fewer scales in its series of scales, and at least one trigonometric scale at an end of said second series of scales and on a scale of magnitude commensurate with each of the scales of both series of scales.

5. The invention according to claim 4, there being a plurality of series of trigonometric scales, each scale corresponding to more than one of said logarithmic scales in extent.

References Cited in the file of this patent

UNITED STATES PATENTS

| | | |
|---|---|---|
| 157,239 | Stapff | Nov. 24, 1874 |
| 843,944 | Hibbard | Feb. 12, 1907 |
| 1,168,059 | Cuntz | Jan. 11, 1916 |
| 2,158,476 | Morse | May 16, 1939 |
| 2,455,522 | Ringler | Dec. 7, 1948 |

FOREIGN PATENTS

| | | |
|---|---|---|
| 26,526 | France | Aug. 14, 1923 |
| 709,026 | Great Britain | May 12, 1954 |
| 349,727 | Italy | June 21, 1937 |